US011202128B2

(12) United States Patent
Pulicharla et al.

(10) Patent No.: US 11,202,128 B2
(45) Date of Patent: Dec. 14, 2021

(54) METHOD AND APPARATUS FOR MODIFYING OUTPUT CHARACTERISTICS OF PROXIMATE DEVICES

(71) Applicant: Rovi Guides, Inc., San Jose, CA (US)

(72) Inventors: Durga Prasad Pulicharla, Andhra Pradesh (IN); Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/393,355

(22) Filed: Apr. 24, 2019

(65) Prior Publication Data
US 2020/0344530 A1    Oct. 29, 2020

(51) Int. Cl.
*H04N 21/485* (2011.01)
*H04N 21/472* (2011.01)
*G06F 3/14* (2006.01)
*H04N 21/4722* (2011.01)
*H04N 21/84* (2011.01)

(52) U.S. Cl.
CPC ....... *H04N 21/4854* (2013.01); *G06F 3/1423* (2013.01); *H04N 21/4722* (2013.01); *H04N 21/47205* (2013.01); *H04N 21/84* (2013.01)

(58) Field of Classification Search
None
See application file for complete search history.

(56) References Cited

U.S. PATENT DOCUMENTS

| 8,949,901 | B2* | 2/2015 | Hays | H04N 21/4131 |
| | | | | 709/219 |
| 2009/0328087 | A1* | 12/2009 | Higgins | H04N 21/25816 |
| | | | | 725/10 |
| 2011/0046755 | A1* | 2/2011 | Sung | H04N 21/440263 |
| | | | | 700/90 |
| 2013/0007809 | A1* | 1/2013 | Hays | H04N 21/8173 |
| | | | | 725/47 |
| 2014/0143806 | A1* | 5/2014 | Steinberg | G11B 27/034 |
| | | | | 725/34 |
| 2014/0267906 | A1* | 9/2014 | Mickelsen | H04N 5/04 |
| | | | | 348/515 |
| 2014/0280879 | A1* | 9/2014 | Skolicki | H04L 69/28 |
| | | | | 709/224 |

(Continued)

OTHER PUBLICATIONS

U.S. Appl. No. 16/393,351, filed Apr. 24, 2019, Durga Prasad Pulicharla.

(Continued)

*Primary Examiner* — John W Miller
*Assistant Examiner* — Sean N. Haiem
(74) *Attorney, Agent, or Firm* — Haley Guiliano LLP

(57) ABSTRACT

Systems and methods for reducing distractions from nearby devices when content susceptible to interruption is being consumed. Content susceptible to interruption is determined, and when this content is consumed on one device, nearby devices are identified and their output characteristics are modified. For example, output volume of nearby devices may be reduced, or the volume of the first device may be increased. This process is repeated with different devices as they each output content determined to be susceptible to interruption. Consumers are thus presented with fewer distractions from surrounding devices while they are consuming content that is susceptible to interruption.

19 Claims, 7 Drawing Sheets

(56) References Cited

U.S. PATENT DOCUMENTS

| | | | | |
|---|---|---|---|---|
| 2015/0264439 | A1* | 9/2015 | Karlin | H04N 21/443 725/12 |
| 2016/0080792 | A1* | 3/2016 | Kosseifi | H04N 21/812 725/34 |
| 2016/0148055 | A1* | 5/2016 | Zilberstein | H04N 21/23418 386/241 |
| 2016/0322018 | A1* | 11/2016 | Peterson | G06F 3/147 |
| 2016/0366468 | A1* | 12/2016 | Seo | G06F 3/04842 |
| 2017/0115953 | A1* | 4/2017 | Alders | G06F 3/165 |
| 2018/0027373 | A1* | 1/2018 | Wang | H04W 4/023 455/456.3 |
| 2018/0027374 | A1* | 1/2018 | Wang | H04W 4/023 455/456.3 |
| 2018/0139071 | A1* | 5/2018 | Onohara | H04N 21/43637 |
| 2018/0139565 | A1* | 5/2018 | Norris | H04S 1/007 |
| 2018/0181366 | A1* | 6/2018 | Bowling | G10L 19/018 |
| 2019/0014378 | A1* | 1/2019 | Shah | H04N 21/44218 |
| 2019/0149584 | A1* | 5/2019 | DiBello | H04N 21/4394 709/204 |
| 2019/0332347 | A1* | 10/2019 | Cedborg | G06F 3/165 |
| 2019/0372541 | A1* | 12/2019 | Friant | H03G 3/3089 |

OTHER PUBLICATIONS

PCT International Search Report for International Application No. PCT/US2020/029638, dated Jul. 30, 2020 (12 pages).

* cited by examiner

METHOD AND APPARATUS FOR MODIFYING OUTPUT CHARACTERISTICS OF PROXIMATE DEVICES

BACKGROUND

Embodiments of the disclosure relate generally to content consumption on electronic devices. More specifically, embodiments of the disclosure relate to reducing distractions during consumption of content on electronic devices.

SUMMARY

The wide availability and selection of digital content, combined with the large number of electronic devices available for its display, mean that consumers may select and consume desired content at almost any time and any location that they wish. Additionally, contemporary personal electronic devices are now equipped with many different functions, allowing users to employ their devices at seemingly all times, for many different uses.

The flexibility and availability of such electronic devices is not without its drawbacks, however. For example, many different devices are often used in close proximity to each other, raising the possibility that some devices may disturb or distract nearby users of other devices. This is particularly true in areas such as homes, coffee shops, and other areas where people frequently congregate. In the home example, multiple members of the same household can find themselves sitting in the same room but each utilizing different electronic devices at the same time. Noises emitted by any such device may distract other device users in the room. Adding to this problem is the increasingly likely presence of still further devices in the same room or nearby, such as household appliances, electronic peripherals like printers, electronic personal assistants, and the like. Each may output noises, light, or images that may disturb people watching content on their devices.

Accordingly, to overcome the problems and limitations of electronic devices distracting other users when in close proximity, systems and methods are described herein for a computer-based process that determines when a device is consuming content susceptible to interruption, and modifies an output characteristic of other nearby devices. The output characteristic can be any characteristic of an electronic device, such as output volume, screen or indicator light luminance, noise from operation of devices such as home appliances, and the like.

To carry out this process, a system receives identifiers of portions of content designated as susceptible to interruption. Examples of such portions include quiet or dark content whose viewers would be easily distracted by nearby noises or flashing lights, and live content that cannot be rewound and played back after a distraction. Nearby devices are then selected for their proximity to the interruptible content being consumed, and the users of these devices are determined. If the users of these nearby devices are different from the user viewing the interruptible content, then output characteristics of these nearby devices are modified while interruptible content is being consumed. In this manner, the system continuously scans for portions of content that are susceptible to interruption, and when these portions are being consumed, modifies the output characteristics of other nearby devices, thus reducing distractions for the viewers of interruptible content.

The designation of content as susceptible to interruption may be made via metadata. More specifically, content metadata may contain identifiers or pointers defining those portions of content that have been marked or selected as susceptible to interruption. The identifiers of such content portions may thus be received from content metadata.

It may be beneficial for the system to modify the output characteristics of only those devices that are used by others besides the viewer of interruptible content. In particular, a user may wish to watch both the interruptible content on one device, and other content on another device. For example, a user may wish to watch a movie with scenes susceptible to interruption, while also following a sporting event on his or her phone. Accordingly, it is beneficial for the system to determine the user of each device. In this situation, the user may wish to continue following the sporting event even during sensitive scenes of the movie. To that end, the system may employ user identifiers for each device, where the user identifiers indicate which user is currently using a particular device. The modification in output characteristics may thus be applied to only those devices with a user different from the user streaming interruptible content.

As the risk of interruption only arises for nearby devices, embodiments of the disclosure contemplate the selection of devices by location. A predetermined set of devices can be determined, such as a set of devices which are currently receiving a content stream from a particular source, or which are currently latched onto a particular network. From this set of devices, only those which are near the device consuming interruptible content pose any risk. Thus, the system determines the locations of each device in the predetermined set of devices, and from the locations also determines the distance of each device from the device consuming interruptible content. Those within a certain threshold distance are the only ones whose output characteristics are modified. Devices outside the threshold distance are deemed too far away to disturb the viewer of interruptible content.

Devices can present a disturbance or interruption in many ways. Devices may emit noises that are too loud, for example, or may be so bright as to distract others nearby. Alternatively, devices may consume content that would be inappropriate or disturbing to those currently viewing certain types of content. In particular, viewers of content meant to invoke certain moods may be disturbed by other content that runs counter to those moods. For example, viewers of a cooking show may find it particularly unappetizing when a nearby horror or gore film is playing. Likewise, viewers of a romance movie may find the mood ruined by a nearby device playing a violent action movie. Accordingly, the system can modify any output characteristic of a device. This includes output volume and output luminance, so that both objectionable audio and objectionable images are modified. The output volume can be partially modified, i.e., quieted, or modified to zero, i.e., the content of a device can be muted. The modification in output characteristics, such as volume modification, can be applied to any content consumed on the devices. It can further be applied to any other output of any electronic device. For instance, output characteristic modification may include volume modification or muting of device ringtones, notifications, alerts, and the like.

The embodiments of the disclosure are also not limited to display devices that display electronic content. That is, the system can modify output characteristics of other devices besides those that display content. In particular, the system can modify output characteristics of any device that can connect to a communications network, such as any Internet of Things or connected device. Thus, for example, the system can reduce the output volume of home appliances, can delay operation of noise-generating appliances such as dishwashers until interruptible content is over, or the like.

It should be noted that the above described processes can be repeated as different devices each consume content that is susceptible to interruption. That is, the system can receive indications of portions of content susceptible to interruption for each different device that it is streaming content to. As these portions are consumed on different devices, the other devices may have their output characteristics modified. Thus, at any given time, the device consuming interruptible content may be designated as a priority device for which the remaining devices have their output characteristics modified. As different devices begin to consume interruptible content, those devices then become the priority device, and the process repeats with that new priority device. In this manner, a device may be selected as the priority device when it is consuming interruptible content, and later may have its output characteristics modified when another device is instead designated as the priority device.

When multiple devices are consuming interruptible content at the same time, one can be selected as the priority device. Selection can occur in any manner, such as by selecting one of these devices at random, or by selecting the device consuming live content, live primetime content, video on demand, or pay per view content.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for modifying distractions from nearby devices when content susceptible to interruption is being consumed. Content susceptible to interruption is identified, and when this content is being consumed on one device, nearby devices of other users are identified and their output characteristics are modified. For example, output volume of nearby devices may be reduced. This prevents distractions during consumption of content that is susceptible to interruption.

The device currently consuming content designated as susceptible to interruption may be selected as a priority device, where other devices near the priority device are the devices whose output characteristics are modified. In an environment with multiple devices in proximity to each other and each streaming content, different devices may consume content susceptible to interruption at different times. The priority device may thus change over time. Accordingly, as different devices are selected as the priority device, devices near that priority device have their output characteristics modified.

Figure 1:
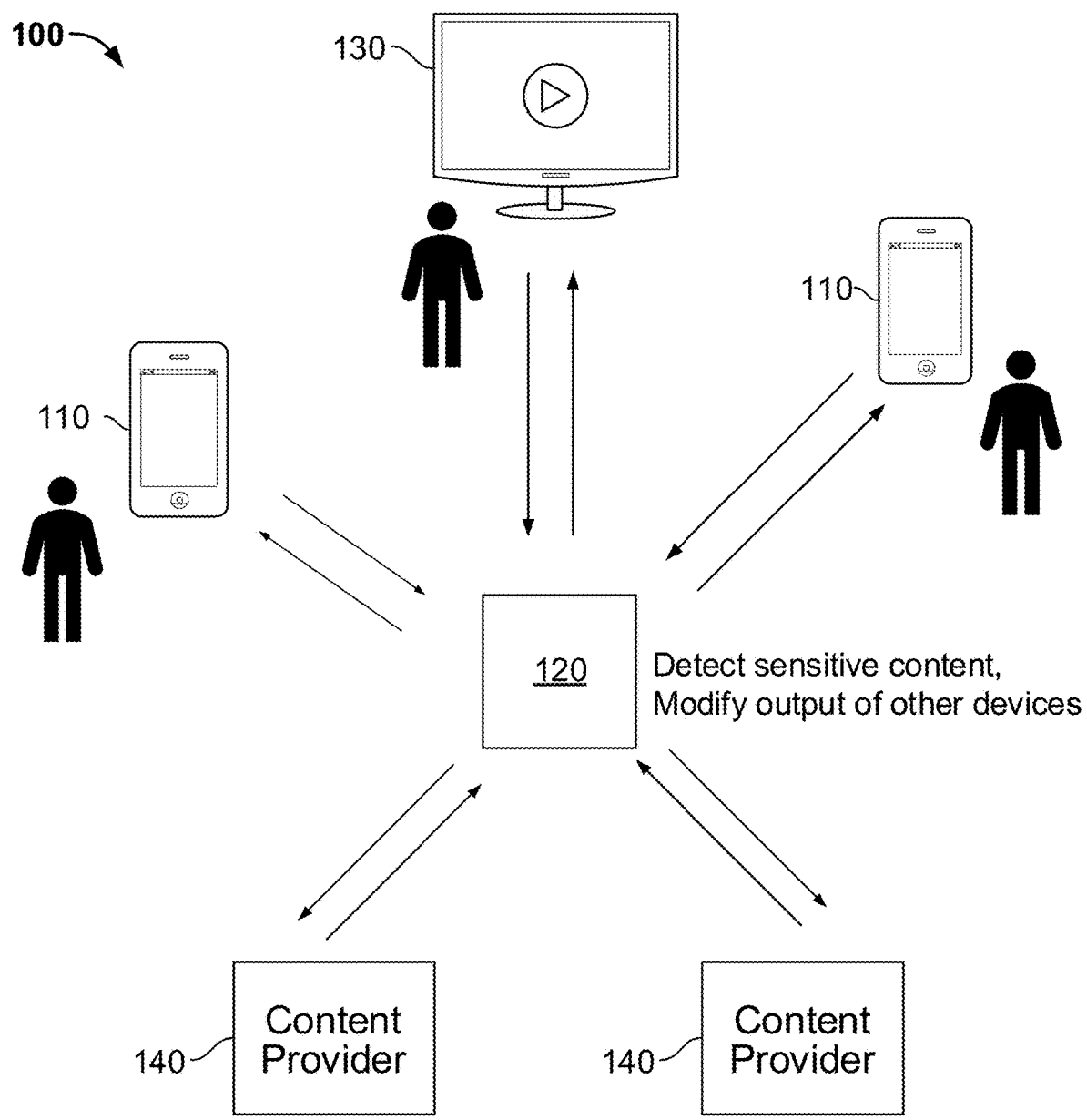
FIG. 1 illustrates an exemplary system for modifying distractions during consumption of selected portions of content on a content device, in accordance with embodiments of the disclosure.

FIG. 1 illustrates an exemplary system for modifying distractions during consumption of selected portions of content on a content device, in accordance with embodiments of the disclosure. System 100 includes a first content consumption device 130 as well as a number of second content consumption devices 110, each being viewed by a user as shown. First and second content consumption devices 130, 110 each communicate with content direction device 120, which receives and forwards content streamed from content providers 140. In other words, content direction device 120 receives content from content providers 140 and transmits it on to the content consumption devices 110, 130 for viewing by users. Content may include any information for presentation to a user, including but not limited to audio and/or visual content such as movies, text, podcasts, and the like, as well as any live or pre-recorded content, where live content can include live events such as sporting events, concerts, live talks, and the like. content also includes any interactive content that users may interact with through their devices 110, 130, such as games, purchasing or e-commerce sites, content upload, audio/video calls, and any other interactive transactions.

In operation of system 100, a user may be, for example, watching a movie on first content consumption device 130, which may be a television. The movie is streamed from one of the content providers 140 to content direction device 120, which in turn transmits the stream to the device 130. Certain scenes of the movie may be scenes that the viewer may not want interrupted. For instance, climactic scenes, quiet or dark scenes easily susceptible to distraction by noises or lights, action scenes, or the like. These scenes may be designated by indicators in metadata of the content stream from content provider 140. The content direction device 120 parses the metadata it receives as part of the content stream from content provider 140, to thereby determine when an easily interruptible scene is playing. When it is, content direction device 120 commands other nearby content consumption devices 110 to modify their various output characteristics, such as output volume or screen luminance. In this manner, nearby second content consumption devices 110 are prevented from producing any output that may disturb the viewer of first content consumption device 130 when device 130 is displaying content susceptible to interruption. This process is repeated for different devices 110, 130 when those devices consume content susceptible to interruption. That is, the content direction device 120 receives indicators of interruption susceptibility for each content stream it receives, and when any such scene is playing, the corresponding device 110, 130 effectively becomes a priority device, for which the remaining nearby devices 110, 130 have their output characteristics modified.

Figure 2:
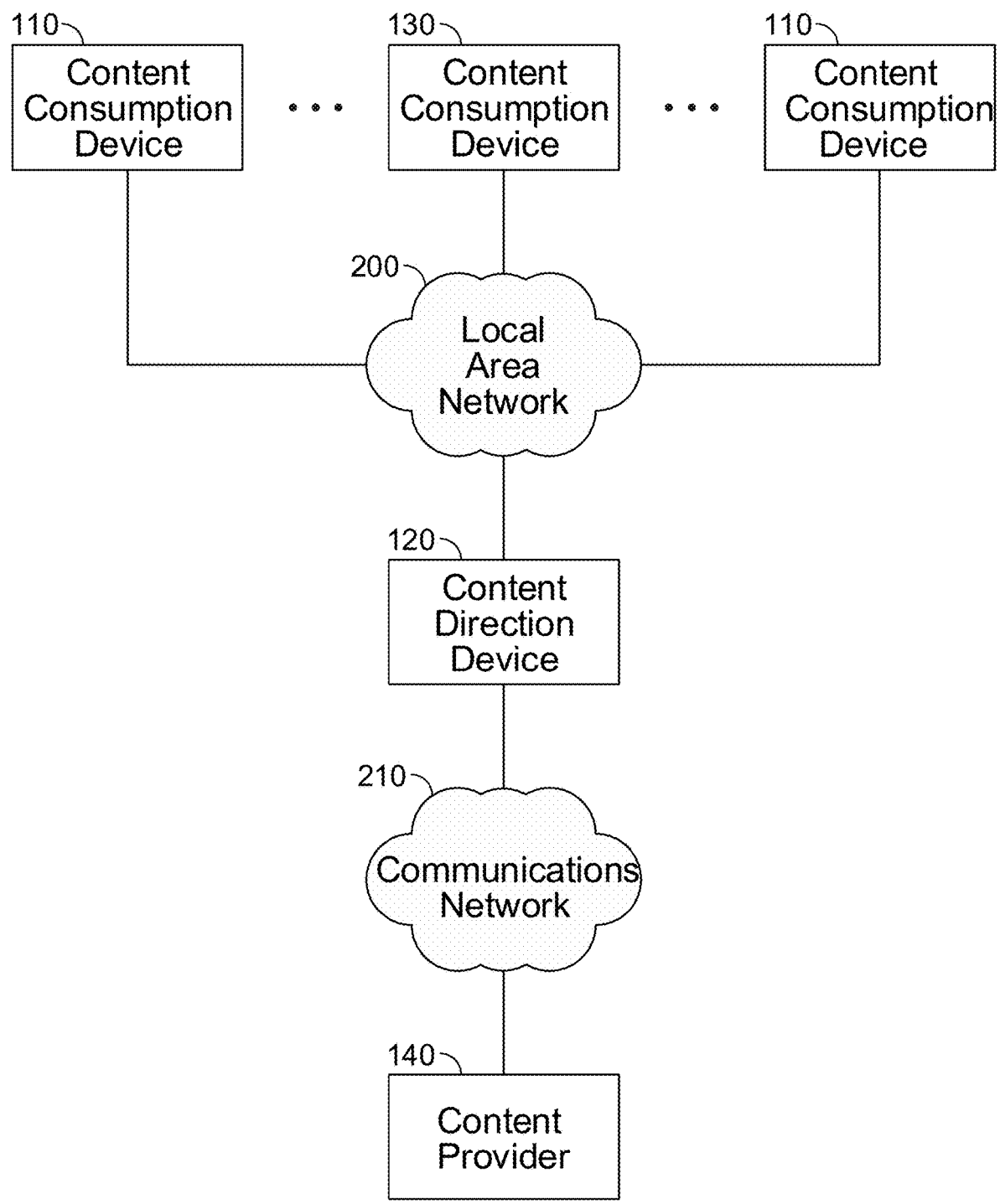
FIG. 2 is a block diagram illustration of the system of FIG. 1.

FIG. 2 is a block diagram representation of the system of FIG. 1, presented for further illustration. Any number of content consumption devices 110 and 130 may be in communication with content direction device 120 through, for example, a local area network 200. The content direction device 120 is in electronic communication with content provider 140 through communications network 210. As one example, the content consumption devices 110 and 130, local area network 200, and content direction device 120 may all be situated within a local area, e.g., within various rooms of a home or office. The content provider 140 may be a remotely located server at a content provider site, and the communications network 210 may be the public Internet. Alternatively, the content provider 140 may be situated within the local area and may be, for example, a local content storage and streaming application on a local computer including any of the above computing devices, or even a storage and display application within the content direction device 120 itself. As in FIG. 1, multiple content providers 140 may be in communication with content direction device 120 through communications network 210.

As above, a user may be watching a show on first content consumption device 110, at which point the content provider 140 is providing a stream of the show through communications network 210 to content direction device 120. The content direction device 120 in turn receives this stream and directs it to device 110 over local area network 200. When another user requests another show or other stream on one of the second content consumption devices 130, the content direction device 120 receives the stream from one content provider 140 and directs the stream to the second content consumption device 130. The content direction device 120 receives indicators of sensitive content, or content susceptible to interruption, from the various streams received from content providers 140. From these indicators, the content direction device 120 determines which device 110, 130 if any is currently receiving sensitive or interruptible content. The device 110, 130 currently receiving such content is designated as a priority device, with the content direction device 120 directing the remaining devices 110, 130 to modify their output characteristics.

Figure 3:
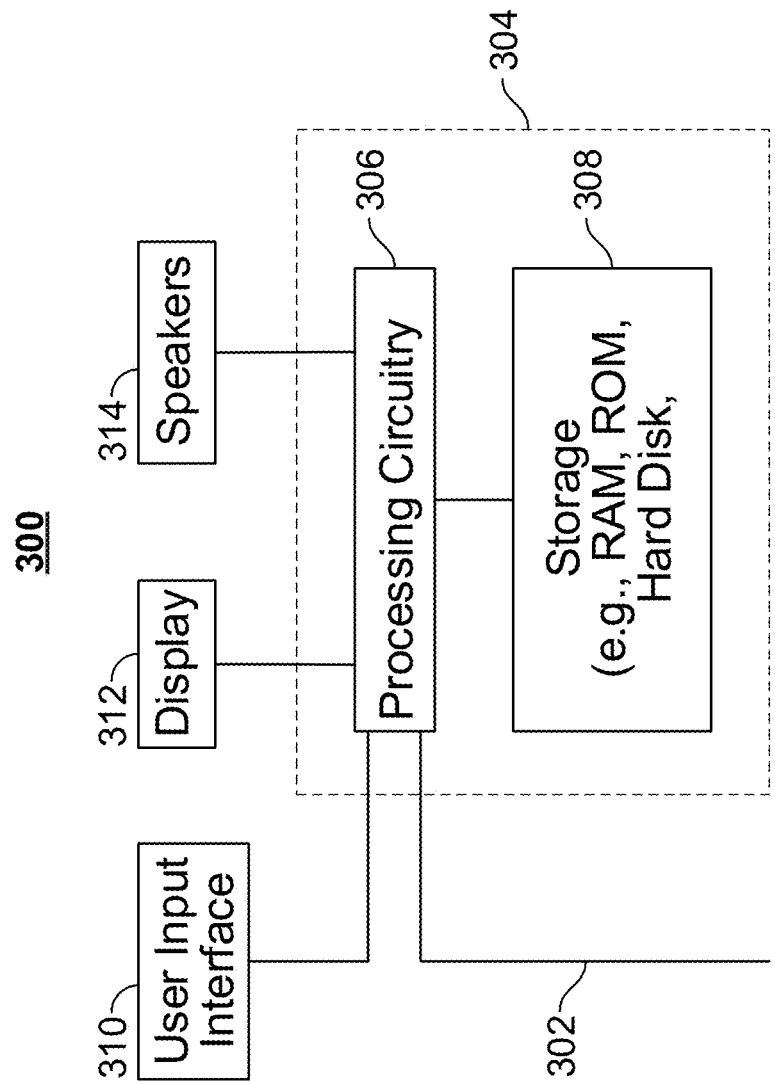
FIG. 3 is a generalized embodiment of illustrative content consumption devices constructed for use according to embodiments of the disclosure.

The content consumption devices 110, 130 may be any devices capable of receiving streamed content and displaying the content for users. For example, content consumption devices 110, 130 may be digital TVs, laptop computers, smartphones, tablet computers, or the like. FIG. 3 shows a generalized embodiment of an illustrative user equipment device 300 that may serve as a content consumption device. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers 140 to stream and display content.

Control circuitry 304 may thus include communications circuitry suitable for communicating with a content provider 140 server or other networks or servers.

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
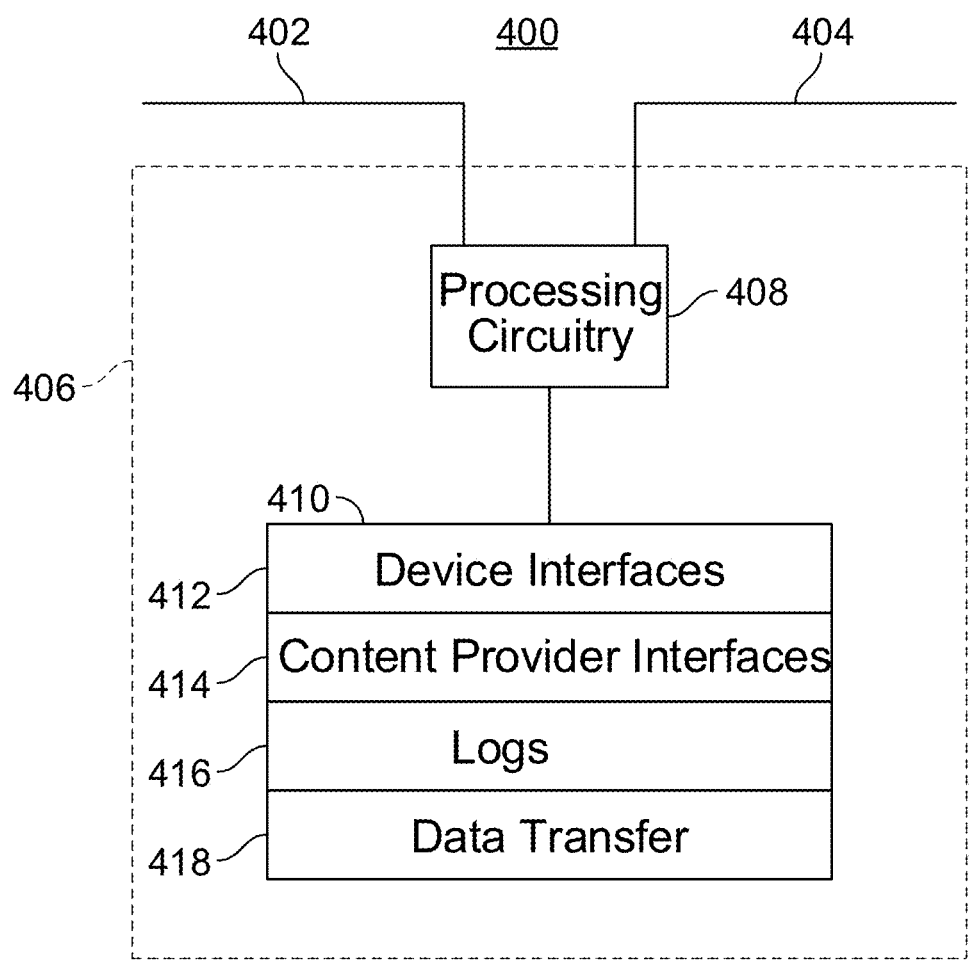
FIG. 4 is a generalized embodiment of an illustrative content direction device constructed for use according to embodiments of the disclosure.

FIG. 4 is a generalized embodiment of an illustrative content direction device 120 constructed for use according to embodiments of the disclosure. Here, device 400 may serve as a content direction device. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300.

Storage 410 is a memory that stores a number of programs for execution by processing circuitry 408. In particular, storage 410 may store a number of device interfaces 412, content provider interfaces 414, logs 416 for keeping track of which devices 110, 130 are currently playing sensitive or interruptible content, and data transfer routines 418. The device interfaces 412 are interface programs for handling the exchange of commands and data with the various content consumption devices 110, 130. Content provider interfaces 414 are interface programs for handling the exchange of commands and content streams with various content providers 140, and are programmed to exchange commands and content similar to a corresponding application program on a content consumption device 110, 130. A separate interface 414 may exist for each different content provider 140 that has its own format for commands or content. Data transfer module 418 handles routing of content streams from the content providers 140 to the appropriate content consumption devices 110, 130. That is, module 418 contains routines for redirecting content streams received from content providers 140 to specific content consumption devices 110, 130. If content is stored within device 400 itself, it may be stored in storage 410 along with an application program that streams the stored content to a destination specified as below.

The device 400 may be any electronic device capable of receiving content streams and transferring them to one or more content consumption devices 110, 130. For example, the device 400 may be a networked in-home smart device connected between a home modem and various content consumption devices 110, 130. The device 400 may alternatively be a laptop computer or desktop computer configured as above.

Figure 5:
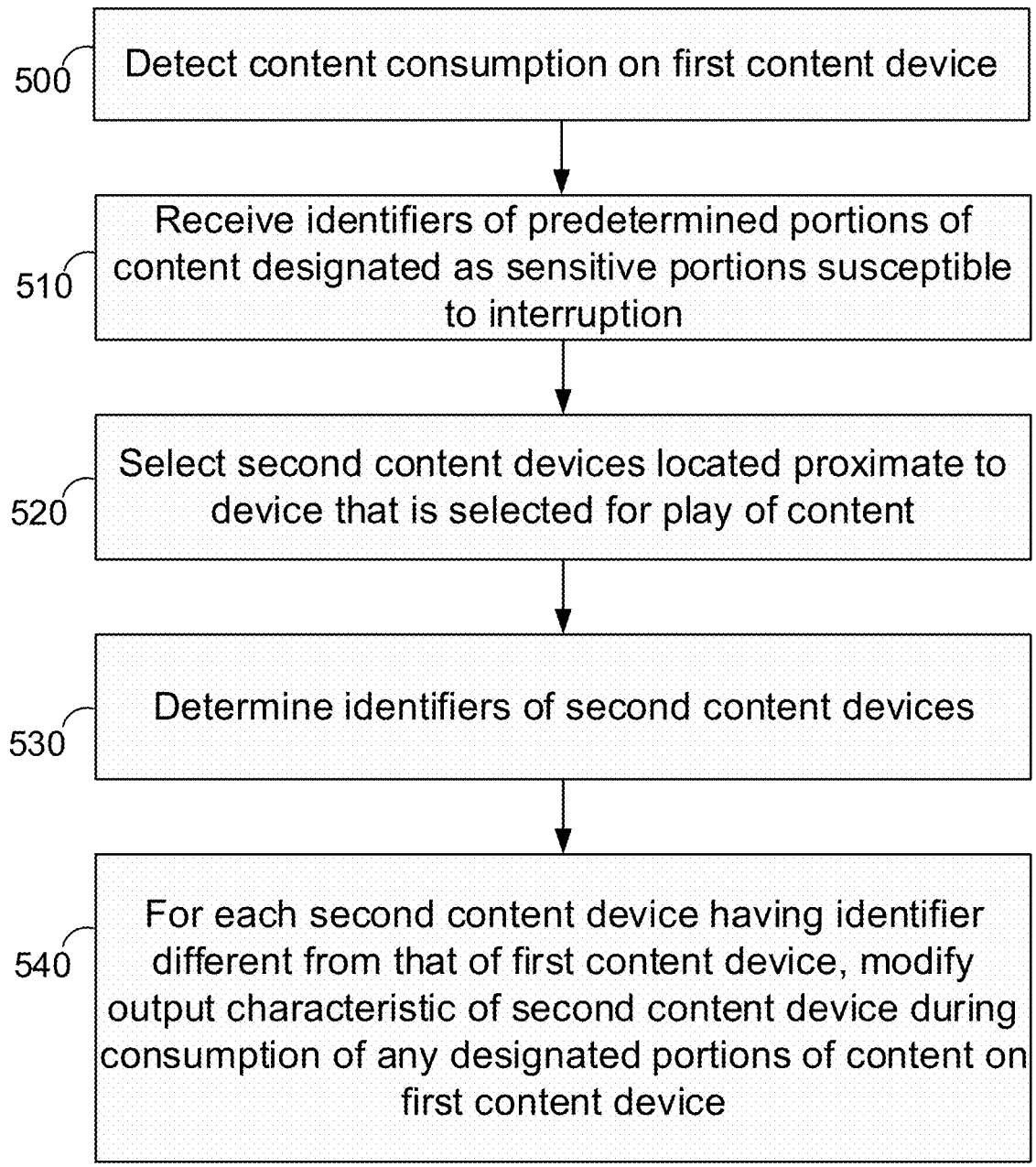
FIG. 5 is a flowchart illustrating process steps for selecting second content devices and modifying their output characteristics during consumption on a first content device of content susceptible to interruption.

FIG. 5 is a flowchart illustrating process steps for selecting second content devices and modifying their output characteristics during consumption of interruptible content on a first content device. In an environment in which content direction device 120 receives multiple content streams and forwards them to multiple devices 110, 130, the content direction device 120 detects content consumption on a first content device, i.e., one of the devices 110, 130 (Step 500). The content direction device 120 also receives from its content streams identifiers of portions of content designated as susceptible to interruption (Step 510). As above, these identifiers may be received from the metadata of content streams transmitted by content providers 140. From these identifiers, the content direction device 120 determines which device 110, 130 is currently consuming content designated as susceptible to interruption. In this example, the content consumption device 130 is the device currently consuming content designated as susceptible to interruption, and can be referred to as the first device. The content direction device 120 then selects second content devices located proximate to a first content device (Step 520) and determines identifiers of the second content devices (Step 530), to determine whether users of the second content devices 110 are different from the viewer of the first content direction device 130. For each second content device 110 having a determined identifier different from an identifier of the first content device, i.e., for each device 110 with a user different from the user of device 130, the content direction device 120 modifies an output characteristic of that second content device 110 during consumption of any portions of identified content on the first content device (Step 540). Modification of output characteristics can include reduction or muting of outputs such as volume or luminance, as above. Modification can also include redirection of outputs to other devices, for example redirecting notifications or alerts to another less intrusive device, such as headphones or a smartwatch. Any modification that alters any output characteristic of a device is contemplated, so long as it reduces the intrusiveness of the output characteristic during periods of interruptible content.

The device identifiers described above are identifiers of specific users, and are used by the content direction device 120 to determine the user of each content consumption device 110, 130. Determination of device 110, 130 users may be performed in any manner. This includes simply assuming that each device 110, 130 has a unique user. Alternatively, the content direction device 120 may keep a record of users and devices in its logs 416, from which the user of each device 110, 130 is determined. Each user may be assigned a unique user identifier UID. Each user identifier UID can be associated with one or more device identifiers DID corresponding to the devices that the user has used at one time. The logs 416 may also store account identifiers AID for each account with one of the content providers 140. The account identifiers AID are also associated with the UID of the user owning each account. Additionally, the logs may store pointers to user profiles P_UID which are unique user profiles for each user. The user profiles may also be stored in storage 410 or elsewhere as appropriate.

The record of users can be built over time, as various users use the devices 110, 130. Initially, each device 110, 130 can be assigned one user UID, and as users add accounts, the new account identifiers AID are stored for each device DID that account is used on. A user profile UID is generated or retrieved for each UID, along with a pointer P_UID to that profile. Users can be added as new users register, new devices are added, as new accounts are added, or as comparison of the user profiles indicates that someone is requesting content that does not fit any existing user profile. The determination of a new user by negative comparison to existing profiles is known, and any such method is contemplated by the instant disclosure.

Storing this information in the logs 416 allows the content direction device 120 to determine the user of each device 110, 130. When the content direction device 120 receives a request to stream content, it determines the device identifier DID of the device from which it receives the request, and the account identifier AID of the account that generated the request. From this information, associated user identifiers UID are determined with reference to the logs 416. If only one user identifier UID is associated with the device that requested the content, or if only a single UID is associated with the AID that generated the request, that user can be deemed to be the user currently requesting content. If multiple UIDs are associated with the DID and AID, the correct user is determined by comparison of the requested content to the user profiles (retrieved with associated pointer P_UID) associated with each of the multiple UIDs. The profile expressing a preference for content that most closely matches the requested content may be deemed to identify the correct user. Such user identification processes are known. The present disclosure contemplates the selection of a correct user from among multiple candidates, with reference to user profiles, in any manner. The user identification steps herein may also be repeated when content is requested on a subsequent device, to determine the user of each device requesting content.

In this manner, the user of each device 110, 130 is determined as it requests content. Devices 110 whose user is determined to be the same as the user of device 130 do not have their output characteristics modified during periods of sensitive or interruptible content. That is, the output characteristic modification of embodiments of the disclosure may be applied only to devices used by users other than the viewer of sensitive or interruptible content. When the viewer of such content is also engaging with another device, it may be assumed that the viewer wishes to direct his or her attention to that other device, rather than the sensitive or interruptible content. Accordingly, the output characteristics of that device are not modified. It is noted, however, that embodiments of the disclosure also contemplate modifying output characteristics of all devices near that device which is consuming sensitive or interruptible content, regardless of whether they involve a common user. That is, the disclosure includes embodiments in which devices 110 have their output characteristics modified even when they are being viewed by the user of device 130 displaying sensitive or interruptible content.

As above, content metadata may contain indicators labeling or flagging portions of that content as being susceptible to interruption, i.e., sensitive or interruptible. Content may be determined to be sensitive or interruptible in any manner, and according to any criteria. As one example, the determination of sensitive or interruptible content may be made according to an analysis of content image frames. Fast-changing content may be considered as sensitive or susceptible to interruption, as such content is hard to follow in the face of distractions. Accordingly, content may be flagged as sensitive or interruptible when its image frames change at a rapid pace. Successive frames may thus be compared, and a series of such frames that each differ significantly from the previous frame can be flagged as sensitive or interruptible. Similarly, content may be flagged when subsequent frames have a brightness variance exceeding a predetermined threshold, i.e., frames change rapidly in brightness (for example creating a strobing or flashing effect). Likewise, content may be flagged when frames with highly contrasting intensity between background and foreground are detected, thus requiring the viewer's eyes to need time to adjust. The adjustment may be hindered by proximate devices exceeding a brightness threshold. The comparison of images in successive frames is known, and any such method is contemplated.

Content may alternatively be flagged in any other manner. Live sporting events, for example, may be flagged when scores exceed a certain amount, if opponent scores are within a certain amount of each other (close game), if the sporting event is in an overtime period, or the like. Ad slots within live content may also be flagged as sensitive or interruptible. Live content may also be flagged in real time, so that certain events occurring live may trigger designation as sensitive or interruptible content. For example, detection of sudden bright flashes such as gunfire, or sudden high audio volume such as crowd noise indicating a goal or a score, may trigger the live content stream to be flagged as sensitive or interruptible.

As another example, the determination of sensitive or interruptible content may be made according to an analysis of content audio. For instance, loud scenes such as action scenes may be considered susceptible to interruption, as viewers may find them engrossing and wish to view them undisturbed. Similarly, quiet scenes may also be considered susceptible to interruption, as any disturbance is easily heard by viewers. Accordingly, content may be flagged as sensitive or interruptible when the measured volume of a scene is greater than some predetermined upper bound, or lower than some predetermined lower bound. Volume may be measured in any manner, including average volume of a scene, peak or lowest volume of a scene, or any other measure of volume over time. The predetermined upper and lower bounds may each be of any value. As another example, certain specific sounds may be determined within content, including emotional sounds such as crying, screams, crashes, gunfire, and the like, where detection of any of these sounds may indicate a scene susceptible to interruption. Detection of such sounds is known, and includes comparison to a stored set of sounds, machine classification of sounds, and other methods. Any such approach is contemplated.

As a further example, the determination of sensitive or interruptible content may be made according to an analysis of content text. More specifically, closed caption or subtitle text may be scanned for certain words that correspond to scenes susceptible to interruption. In one implementation, a dictionary of such words may be stored, and closed caption or subtitle words that match words in the dictionary may indicate a scene susceptible to interruption. The dictionary may include words that convey emotion, so that one or more such words may indicate emotional content that viewers may wish to watch undisturbed. Subtitles that include musical notes or names of background music pieces may also indicate climactic or emotional scenes. Any such text, in any amounts, may be used to indicate sensitive or interruptible content.

Embodiments of the disclosure contemplate flagging content as susceptible to interruption according to any one or more of content images, audio, and text. Additionally, as content typically originates from the content providers 140, the content providers 140 may be the entity that labels portions of content as sensitive or interruptible. Any entity may be responsible for labeling content, however. In particular, the content direction device 120 may analyze content streams as it receives them, to determine when a portion of a stream is susceptible to interruption. Any device on the network of FIG. 2 may be configured to analyze content to determine content portions susceptible to interruption. Furthermore, in some embodiments, content direction device 120 may disregard sensitive or interruptible content, or disable output modification of nearby devices, in its discretion. For example, content direction device 120 may not perform any output modification of nearby devices 110 that are connected to headphones, or located nearby but in a closed room, or that do not otherwise pose a risk of interruption. Determination of device 110 status, such as being headphone connected or in a closed room, may be accomplished in any manner, such as by direct querying of the devices 110 by content direction device 120, user input, and location information as further described herein.

Figure 6:
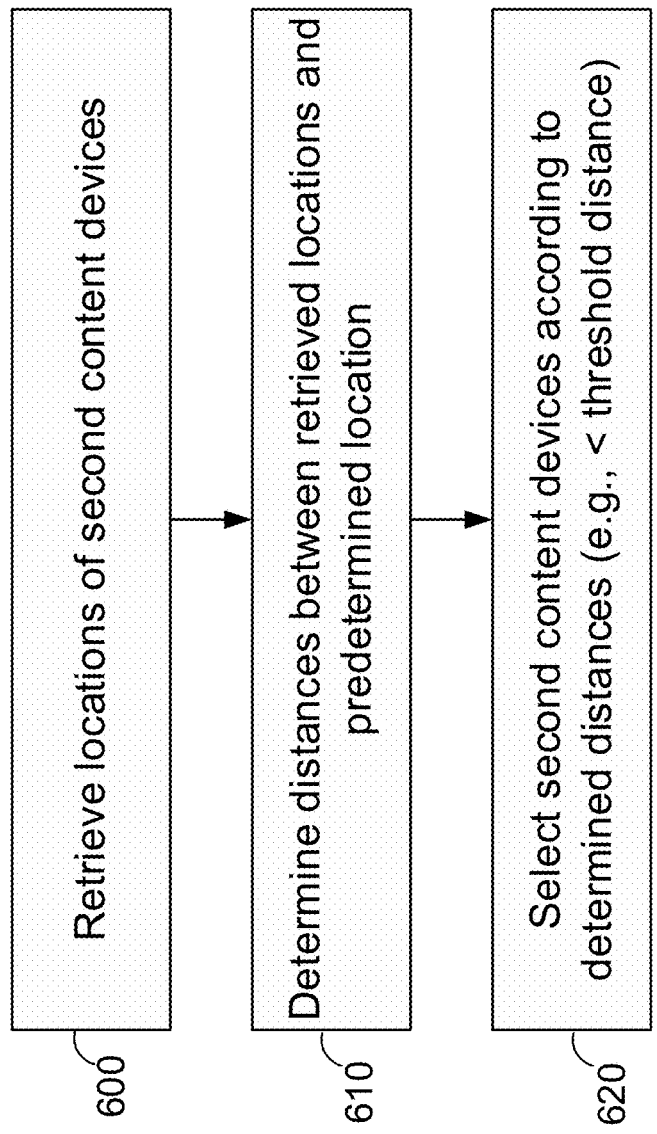
FIG. 6 is a flowchart illustrating process steps for selecting the second content devices of FIG. 5.

As described above, once the content direction device 120 determines content designated as sensitive or susceptible to interruption, device 120 then selects those devices 110 that are located near the device 130 consuming the sensitive content. The devices 110 can be selected according to their distance from device 130, and can be located at any distance proximate to device 130. Proximity can be determined in any manner. For example, devices 110 can be considered proximate to device 130 if they are within any predetermined distance from device 130, if they are within the same room, on the same local area network 200, or the like. FIG. 6 is a flowchart illustrating process steps for selecting second content devices 110 by predetermined distance. Locations of second content devices 110 are first retrieved (Step 600). These locations may be retrieved from the devices 110 themselves when such information is available, and may be for example global positioning system (GPS) location information determined by GPS chipsets within devices 110. Location may also be determined in any other manner, such as by preprogrammed locations stored in either devices 110 or content direction device 120, preprogrammed flags indicating certain devices are in the same room (which may be entered by users), Bluetooth proximity to the device 120, or the like. Any method of determining device location is contemplated.

Once the locations of second content devices 110 are determined, the content direction device 120 determines the distances between the retrieved locations and the location of device 130 (Step 610). The location of device 130 may be retrieved in the same manner as for devices 110 in Step 600, or in any other manner. For instance, the location of device 130 may be approximated as the location of the content direction device 120. Any method of determining distances between a first content device 130 and second content devices 110 is contemplated. Alternatively, in cases where it is known which room certain devices are in, a precise location need not be calculated.

The second content devices 110 are selected according to the distances determined in Step 610 (Step 620). Selection may be by any criteria. For instance, devices 110 may be selected as second content devices if they are located within any threshold distance of device 130. This threshold distance may be any value, e.g., 10 feet, 20 feet, the same room, or the like.

It is noted that the above described process of modifying output characteristics of nearby devices 110 is a repetitive one. That is, as the content direction device 120 streams sensitive or interruptible content to any device 110, that device 110 becomes the device 130, and the previous device 130 becomes a device 110. In other words, as devices 110, 130 consume sensitive or interruptible content, the remaining nearby devices 110, 130 have their output characteristics modified.

Figure 7:
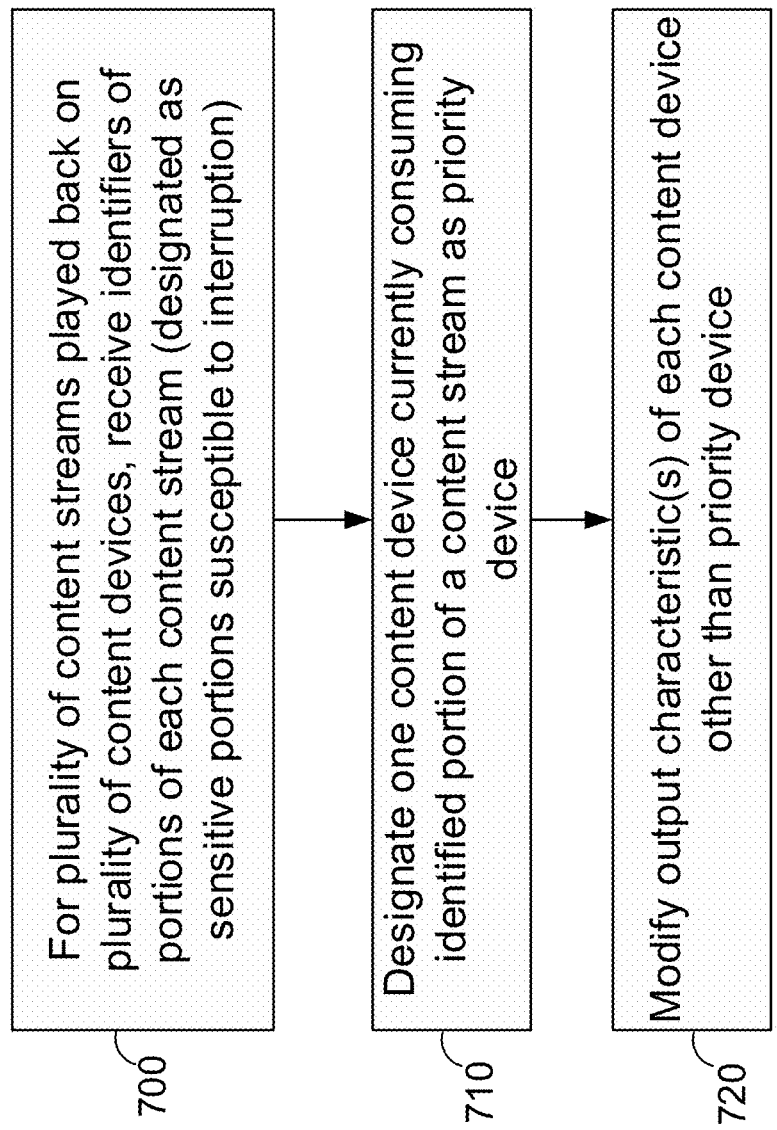
FIG. 7 is a flowchart illustrating process steps for selecting priority devices and reducing output characteristics of devices other than the priority devices.

FIG. 7 is a flowchart illustrating this process in further detail. As above, when a number of content streams are being consumed on multiple content devices 110, 130, the content direction device 120 receives identifiers of predetermined sensitive or interruptible portions of each content stream (Step 700). One of the content devices currently consuming the predetermined portion of its content stream is then designated as a priority device (Step 710). When only one device is consuming a sensitive or interruptible portion of content, that device is designated as the priority device. When more than one device 110, 130 is consuming sensitive or interruptible content at a given time, the content direction device 120 selects one such device 110, 130 as the priority device. The remaining devices 110, 130 have their output characteristics modified even if they are one of the devices currently consuming sensitive or interruptible content.

The content direction device 120 may select priority devices in any manner. As one example, the content direction device 120 may randomly select one of the devices currently consuming sensitive or interruptible content to be the priority device. Alternatively, device 120 may select the first device to consume sensitive or interruptible content.

As another example, different types of content may be assigned different priority levels, so that in the event of a conflict between different content streams each designated as sensitive or interruptible, the content stream with the highest priority level is designated as the priority device. For instance, live, or live primetime, content may be assigned the highest priority level, followed by video on demand and pay per view content. Any hierarchy of priority levels for any types of content is contemplated. Priority levels may be included in content metadata as, or as part of, the indicators of sensitive or interruptible content portions.

Any method of selecting priority devices from among a set of devices is contemplated. That is, the content direction device 120 may employ any one or more of the above described methods to determine the priority device at any given time.

Once the priority device is designated, content direction device 120 modifies one or more output characteristics of each content device other than the priority device (Step 720). As above, the output characteristics may be any output of any device, such as device volume output, screen luminance, and the like. When the devices in question are appliances, Internet of Things or connected devices, etc., the output characteristics may include device on/off states, indicator lights, and the like. That is, when sensitive content is being consumed on a device 110, 130, the content direction device 120 may turn off nearby appliances until the sensitive content is done being consumed, may turn off or lower appliance indicator lights, or modify/stop any other appliance output. In this manner, the content direction device 120 continually designates different devices 110, 130 as the priority device as different devices 110, 130 consume content portions determined to be sensitive or interruptible.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, portions of content may be designated as susceptible to interruption via any criteria, and other nearby content devices can be determined in any manner, whether by location or otherwise. Additionally, conflicts between multiple devices each simultaneously consuming content susceptible to interruption may be resolved by selecting one of the devices at random, by selecting devices according to predetermined priority levels associated with their content, or in any other manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of modifying volume of proximate devices, the method comprising:
    detecting a first device configured for playing a first content stream at a first volume;
    detecting a second device proximate to the first device, and configured for playing a second content stream at a second volume, wherein the first content stream is different than the second content stream;
    for a plurality of different content streams simultaneously consumed on the first and second devices, identifying, scenes susceptible to interruption of each content stream;
    in response to identifying, that a first scene of the scenes susceptible to interruption is being consumed on the first device, and based on analysis of genres of both the first content stream and the second content stream, lowering the volume for the second device consuming the second content stream;
    after conclusion of the first scene, identifying, that a second scene being consumed on the first device is not susceptible to interruption by the second content stream that is played by the second device; and
    adjusting the volume for the second device consuming the second content stream to the second volume.

2. The method of claim 1, wherein the identifying further comprises receiving identifiers of scenes of the content stream from metadata of the content stream.

3. The method of claim 1, further comprising, selecting a random one of the first and second devices currently consuming the first scene of the scenes susceptible to interruption of its respective content stream as a priority device.

4. The method of claim 1, further comprising, when more than one of the first and second devices is currently consuming the first scene of the scenes susceptible to interruption of its respective content stream, selecting one of the more than one of the first and second devices consuming live content as a priority device, wherein the first and second devices that is not selected is consuming content that is recorded.

5. The method of claim 4, wherein the selecting further comprises selecting one of the more than one of the first and second devices consuming live primetime content as the priority device.

6. The method of claim 1, further comprising, when more than one of the first and second devices is currently consuming the first scene of the scenes susceptible to interruption of its respective content stream, selecting one of the more than one of the first and second devices consuming video on demand or pay per view content as a priority device.

7. The method of claim 1, wherein the modifying comprises one or more of modifying an output luminance of proximate devices and muting the output volume of each of the devices other than the priority device.

8. The method of claim 1, wherein the modifying further comprises modifying an output volume of one or more of ringtones of each of the devices other than a priority device, notifications of each of the devices other than the priority device, and alerts of each of the devices other than the priority device.

9. The method of claim 1, further comprising:
    selecting additional devices different from the devices of the plurality of the first and second devices; and
    modifying volume of the selected additional devices during consumption of the first scene of the scenes susceptible to interruption of the respective content stream on a priority device;
    wherein the additional devices include connected devices.

10. A system for modifying output characteristics of proximate devices, the system comprising:
    a storage device; and
    control circuitry configured to:
        detecting a first device configured for playing a first content stream at a first volume;
        detecting a second device proximate to the first device, and configured for playing a second content stream at a second volume, wherein the first content stream is different than the second content stream;
        for a plurality of different content streams simultaneously consumed on the first and second devices, identifying, scenes susceptible to interruption of each content stream;
        in response to identifying, that a first scene of the scenes susceptible to interruption is being consumed on the first device, and based on analysis of genres of both the first content stream and the second content stream, lowering the volume for the second device consuming the second content stream;

after conclusion of the first scene, identifying, that a second scene being consumed on the first device is not susceptible to interruption by the second content stream that is played by the second device; and adjusting the volume for the second device consuming the second content stream to the second volume.

11. The system of claim 10, wherein the identifying further comprises receiving identifiers of scenes of the content stream from metadata of the content stream.

12. The system of claim 10, wherein the control circuitry is further configured to select a random one of the first and second devices currently consuming the first scene of the scenes susceptible to interruption of its respective content stream as a priority device.

13. The system of claim 10, wherein the control circuitry is further configured to, when more than one of the first and second devices is currently consuming the first scene of the scenes susceptible to interruption of its respective content stream, select one of the more than one of the first and second devices consuming live content as a priority device, wherein the first and second devices that is not selected is consuming content that is recorded.

14. The system of claim 13, wherein the selecting further comprises selecting one of the more than one of the first and second devices consuming live primetime content as the priority device.

15. The system of claim 10, wherein the control circuitry is further configured to, when more than one of the first and second devices is currently consuming the first scene of the scenes susceptible to interruption of its respective content stream, select one of the more than one of the first and second devices consuming video on demand or pay per view content as a priority device.

16. The system of claim 10, wherein the modifying comprises modifying an output luminance of proximate devices.

17. The system of claim 16, wherein the modifying further comprises muting the output volume of each of the devices other than a priority device.

18. The system of claim 10, wherein the modifying further comprises modifying an output volume of one or more of ringtones of each of the devices other than a priority device, notifications of each of the devices other than the priority device, and alerts of each of the devices other than the priority device.

19. The system of claim 10, wherein the control circuitry is further configured to:

select additional devices different from the devices of the plurality of the first and second devices; and modify volume of the selected additional devices during consumption of the first scene of the scenes susceptible to interruption of the respective content stream on a priority device;

wherein the additional devices include connected devices.

* * * * *